Nov. 15, 1955

L. A. PELLON 2,723,726

DUST COLLECTOR

Filed Aug. 13, 1953

INVENTOR
LOUIS A. PELLON
BY
John E. Stryker
ATTORNEY

Nov. 15, 1955  L. A. PELLON  2,723,726
DUST COLLECTOR
Filed Aug. 13, 1953  3 Sheets-Sheet 2

INVENTOR
LOUIS A. PELLON
BY
ATTORNEY

Nov. 15, 1955  L. A. PELLON  2,723,726
DUST COLLECTOR
Filed Aug. 13, 1953  3 Sheets-Sheet 3
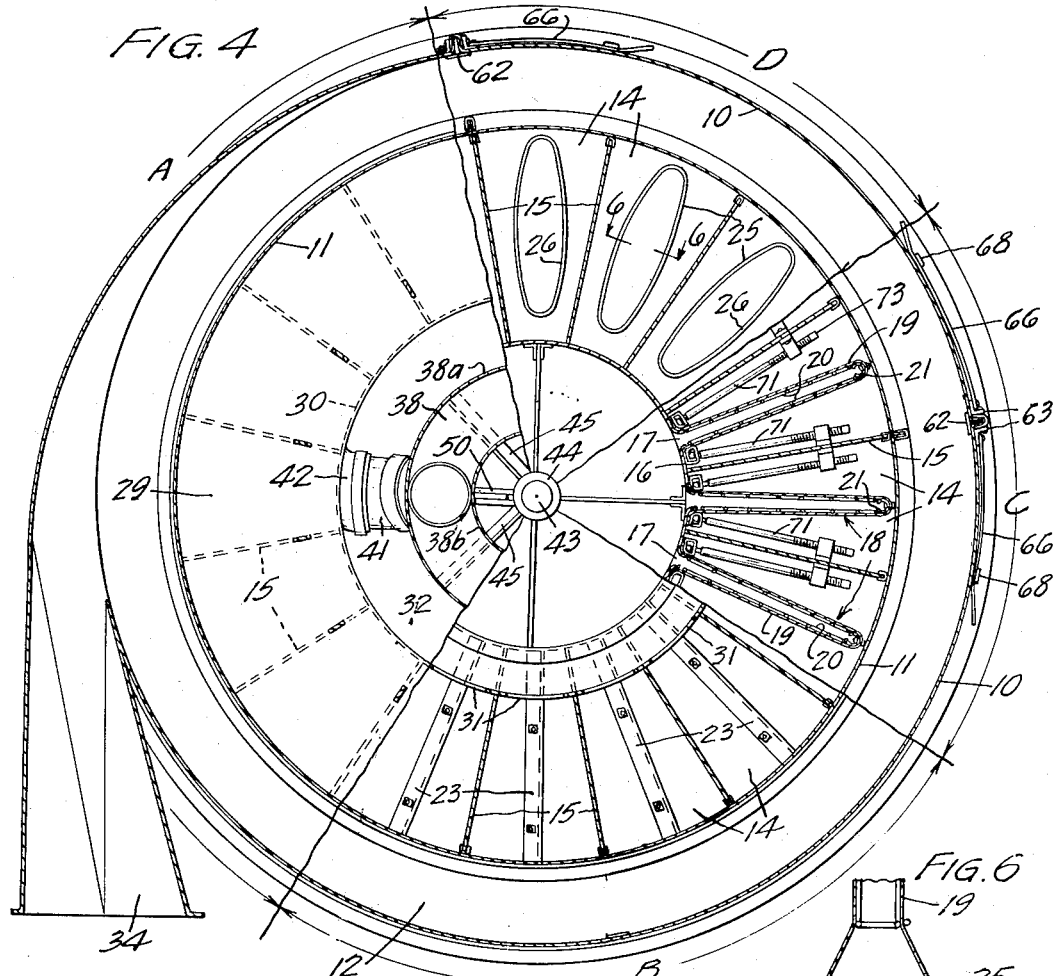
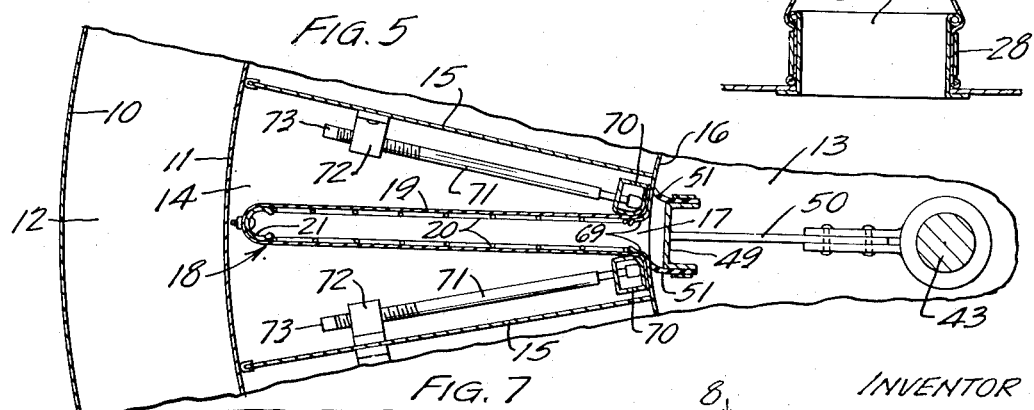
INVENTOR
LOUIS A. PELLON
BY
John E. Thryler
ATTORNEY

United States Patent Office 2,723,726
Patented Nov. 15, 1955

2,723,726

DUST COLLECTOR

Louis A. Pellon, Richfield, Minn.

Application August 13, 1953, Serial No. 374,027

10 Claims. (Cl. 183—57)

This invention relates to improvements in dust collectors of large capacity adapted for various industrial uses for the purpose of purifying air or other gases or to recover solids of value therefrom, or for both purposes.

Among the objects of my invention are to provide a highly efficient and economical arrangement of filter units adapted to be cleaned one at a time continuously during the filtering operation and affording a relatively large filter area in a cylindrical casing.

A further object is to provide in such a filter rotary cleaning apparatus whereby reverse current air may be forced through the several filter units one at a time to discharge accumulations of dust therefrom.

A further and particular object is to improve the efficiency of a filter of the class described by providing a multiplicity of filter units separated by partitions disposed substantially radially within a generally cylindrical casing and adapted to be supplied with dust-laden gas to be filtered from a common annular chamber.

My invention also includes certain other novel features of construction which will be more fully pointed out in the following specification and claims.

Referring to the accompanying drawings which illustrate, by way of example and not for the purpose of limitation, a preferred embodiment of my invention:

Fig. 4 is a horizontal sectional view in which segmental portions of the collector are sectional views taken on the lines A—A, B—B, C—C and D—D of Fig. 3;

Fig. 5 is a fragmentary sectional view taken on the line 5—5 of Fig. 3;

Fig. 6 is a fragmentary sectional view taken approximately on the line 6—6 of Fig. 4;

Fig. 7 is a fragmentary elevational view showing details of the mechanism for fastening segments of the removable cylindrical walls in place, and Fig. 8 is a sectional view taken approximately on the line 8—8 of Fig. 7.

Figure 1:
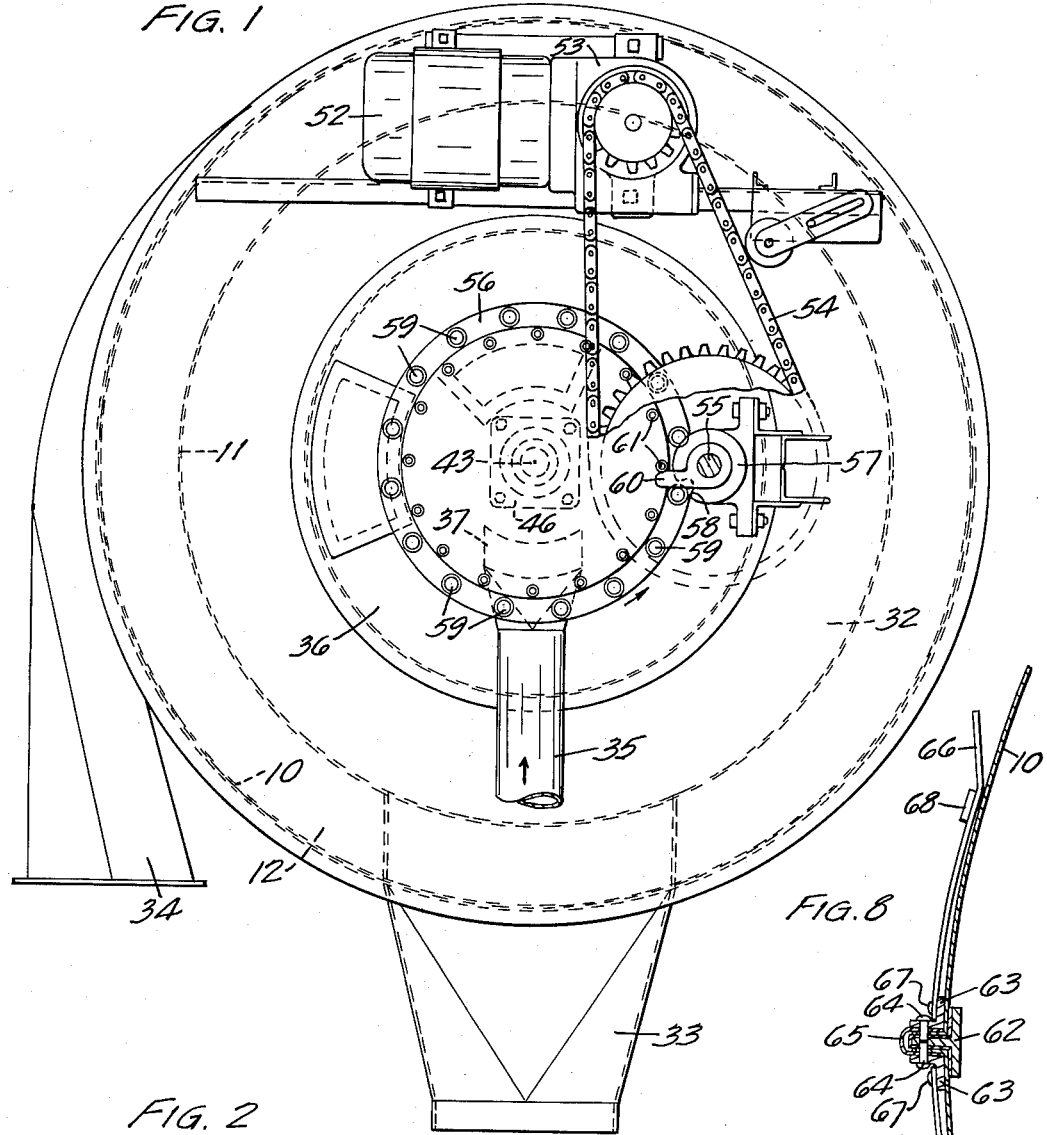
Figure 1 is a top plan view of the collector with a portion of the rotor actuating mechanism broken away to show parts otherwise concealed.

As shown in the drawings, my improved dust collector has a substantially cylindrical outer wall indicated generally by the numeral 10, a similar inner wall 11 forming with the wall 10 an annular chamber 12, a central cylindrical chamber 13 and a multiplicity of filter chambers 14 separated one from another by partitions 15. These partitions extend substantially radially inward from the wall 11 to a cylindrical wall 16 of the chamber 13 and the wall 16 is formed with a multiplicity of vertically elongated openings 17 for the passage of dust-laden gas to the several filter chambers.

Figure 3:
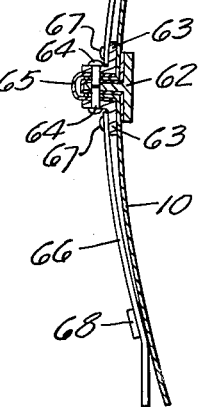
Fig. 3 is a part elevational view and part vertical sectional view through the casings, filter apparatus and cleaning apparatus.
Figure 3:
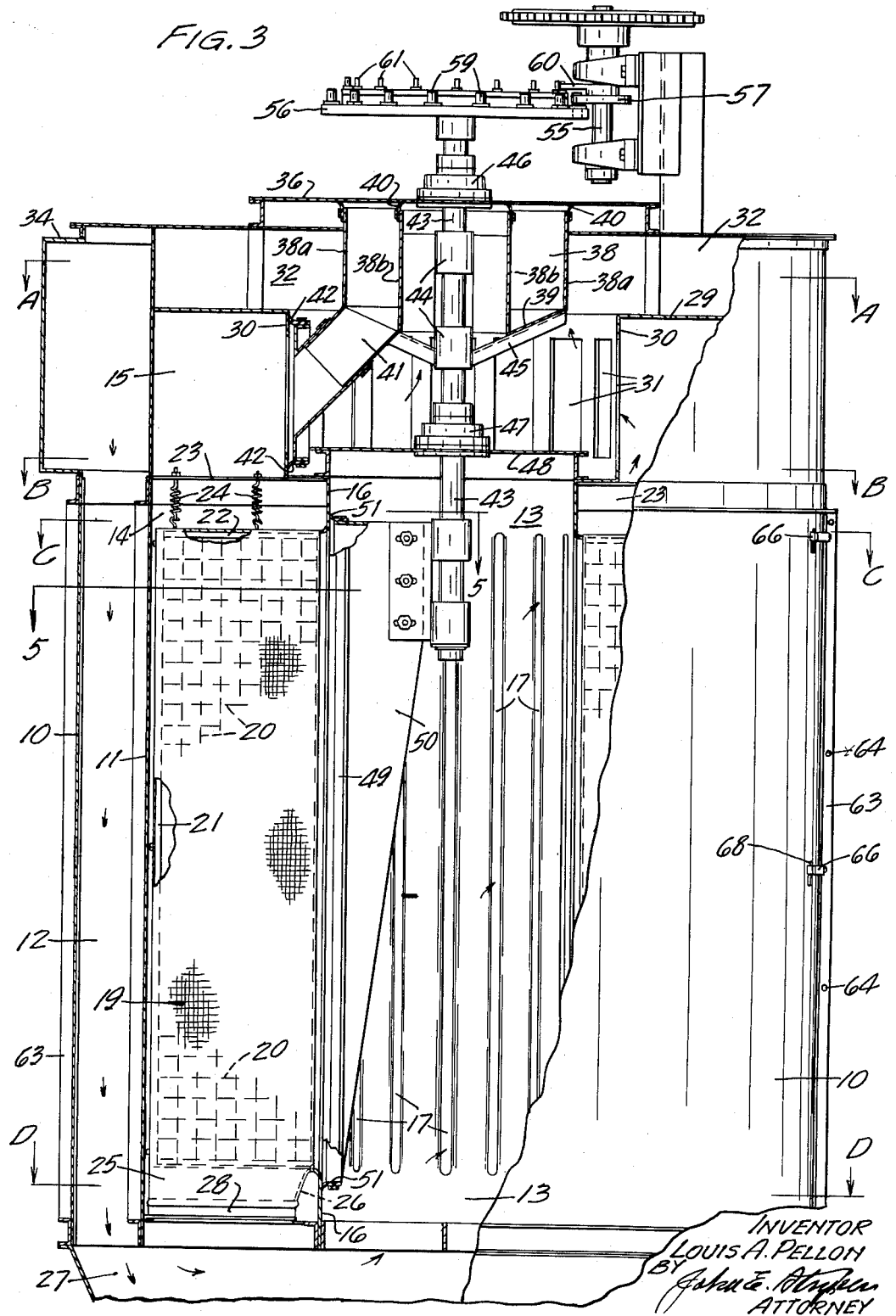

Within each of the filter chambers 14 is removably mounted a filter unit indicated generally by the numeral 18 and comprising a porous fabric bag 19, the opposed side walls of which are held in spaced relation one to the other by a foraminous support 20. This support may comprise a woven wire structure adapted to support the porous bag against inward collapse when the exterior gas pressure exceeds that on the interior. Each of these bags is open at its inner, normally vertical edge so that it communicates through the openings 17 with the cylindrical chamber 13. The outer edge of each bag is closed and supported on a U-shaped member 21 (Fig. 5) and, as shown in Fig. 3, the upper end of each filter bag is also closed and supported on a rigid bar 22 extending radially in the upper portion of the filter chamber and resiliently supported, in turn, on a radial bar 23. A pair of springs 24 extend between bars 22 and 23 in each filter chamber to retain the porous filter material under tension. As shown in Figs. 3 and 6, the lower end portion of each filter bag 19 has a downwardly flaring tubular portion 25 fastened to a tubular outlet member 26 which communicates with a dust bin 27 of conventional form. The bin has walls which converge downward from the cylindrical wall 10 in continuation thereof. Each bag 19 has its end portion 25 removably fastened to a tubular member 26 by an annular clamp band 28.

Figure 2:
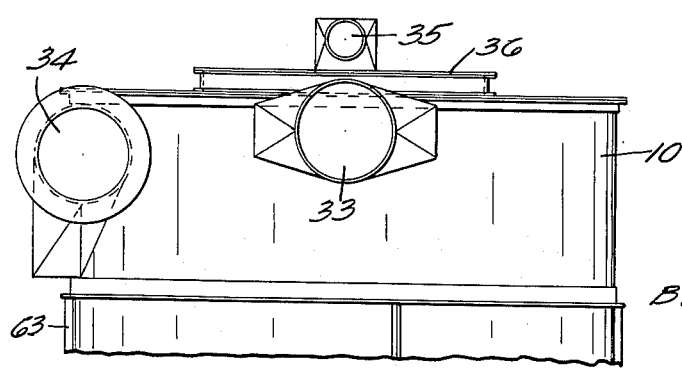
Fig. 2 is a front elevational view showing the upper portion of the cylindrical casing and conduits for admitting dust-laden air or other gas to be filtered, for withdrawing the filtered gas and for admitting air or other gas for cleaning the filter units.

An annular, horizontally disposed partition 29 is fastened in sealing relation to the upper edges of the partitions 15 and from the inner edge of the partition 29 a cylindrical wall 30 extends downward and is formed with a multiplicity of vertically elongated openings 31 severally placing the filter chambers in communication with an annular chamber 32. From the latter chamber air or other gas may be withdrawn or exhausted through an exhaust conduit 33 (Figs. 1 and 2). Dust laden air may be supplied to the annular chamber 12 through a conduit 34 and a third conduit 35 is adapted to supply reverse current air or other gas to the filter cleaning mechanism hereinafter described.

A horizontally disposed removable cover plate 36 is formed with an arcuate opening 37 (Figs. 1 and 2) which places the conduit 35 in communication with an annular rotor chamber 38 (Figs. 3 and 4). This chamber is formed by spaced concentric cylindrical walls 38a and 38b, a bottom member 39 and the plate 36. Each cylindrical wall is provided along its upper edge with a resilient, flexible contact member 40 for sliding contact with the bottom surface of the plate 36, as indicated in Fig. 3. Extending obliquely downward and outward from the chamber 38 is a conduit 41 adapted to connect this chamber successively with the openings 31 in the cylindrical wall 30. The sliding connection between the conduit 41 and wall 30 is sealed by resilient flexible members 42 which remain in sliding engagement with the wall 30 as the rotor chamber 38 revolves. This chamber is secured to an axial shaft 43 by hub members 44 and spoke members 45 so that it rotates with the shaft. Supports for the shaft 43 comprise a bearing 46 mounted on the plate 36 and a bearing 47 on a removable cover plate 48 forming the top closure of the chamber 13. As best shown in Figs. 3 and 5, the shaft 43 projects axially downward in the chamber 13 and carries on its lower end portion a vertically elongated closure member 49 for the openings 17. This closure member is rigidly connected to the shaft by suitable hub members and an arm 50 is provided with resilient flexible contact members 51 adapted to seal the closure at the sides and ends of the openings 17 in the cylindrical wall 16 as the closure rotates.

Suitable driving mechanism for the shaft 43 is shown in Figs. 1 and 3. As shown, this shaft is operatively connected to an electric motor 52 by mechanism which includes speed reduction gearing in a housing 53, sprocket wheels and a chain 54 arranged to continuously turn a cam shaft 55 and a wheel 56 fixed on the upper end of the shaft 43 and operatively connected to the shaft 55. The driving connection between the wheel 56 and shaft 55 causes the shaft 43 to be turned intermittently through an angle which is equal to the angular spacing of the filter chambers, center to center, with a dwell between each increment of movement of such duration as to permit thorough cleaning of the individual filter units by reverse current air or gas. For this purpose I provide a cam 57 having a peripheral notch 58 adapted to engage studs 59 which project upward from the wheel 56 at regularly spaced intervals and a finger 60 projecting from the shaft 55 above the cam 57 to engage studs 61 projecting upward from the wheel 56. Each increment of rotation of the shaft 43 starts when the finger 60 engages one of the studs 61 and the movement is continued by engagement of the adjacent stud 59 in the notch 58 of the cam 57. The dwell period starts when the cam surface defining the notch 58 passes out of engagement with a stud 59. During each dwell period the rotor chamber 38 is in communication through its outlet conduit 41 with one of the filter chambers and the closure member 49 carried by the shaft 43 closes the intake opening 17 of the same filter chamber so that reverse current air is caused to flow through the filter unit in the chamber thereby blowing out accumulations of dust through the open lower end of the unit.

To allow access to the filter chambers 14 and to facilitate the repair and replacement of the filter units 18, segments of the outer cylindrical wall 10 and inner cylindrical wall 11 are made removable and the several filter units are made removable from the individual filter chambers. Suitable fastening means for the wall segments are shown in Figs. 4, 7 and 8. T-shaped vertically extending frame members 62 are provided at intervals around the walls and each wall segment is reinforced along its vertical margins by vertically extending angle bars 63. Each of these bars carries a plurality of laterally projecting studs 64 adapted to removably fit in perforations in the adjoining frame member 62. Also extending longitudinally of the frame member 62 at each joint and formed with perforations to receive the studs 64 is a U-shaped closure member 65. Sealing gaskets of suitable material, e. g., felt, are placed between the margins of the wall members and the adjoining frame members 62. To facilitate the forcing of the reinforced margins of the wall segments into sealing relation to the frame members 62, I provide clamp handles 66 each pivotally connected at 67 to one of the angle bars 63 and arranged to extend circumferentially of the wall. These clamp handles may be secured in wall fastening position by springing their otherwise free end portions into engagement with bracket members 68 which are fixed on the wall segment. The cylindrical walls 10 and 11 are constructed from sheet metal or other somewhat flexible material so that the segments of these walls may be bent sufficiently to permit their attachment and deachmen from the frame members 62 by suitable manipulation of the clamp handles to withdraw the studs 64 from or insert them in the openings in the U-shaped members 65 and frame members 62.

Details of suitable mechanism for detachably mounting the filter units 18 in the filter compartments 14 are best shown in Figs. 3, 5 and 6. As shown in Fig. 5, vertical marginal portions of each filter bag 19 are confined between arcuate flanges 69 formed on the cylindrical wall 16 and a clamping frame 70 disposed to be actuated by clamp screws 71. Supporting bearings 72 are secured to the partitions 15 and have threaded connections with the screws 71. End portions 73 are formed on the screws to be engaged by a suitable tool for actuating the frames 70 to and from the flanges 69. Strips of sealing material, such as felt, are placed between the overlapping marginal portions of the filter bags and frames 70.

When it is desirable or necessary to repair or replace one or more of the filter units, access thereto may be obtained quickly and easily by the removal of appropriate segments of the cylindrical walls 10 and 11, as hereinbefore described with particular reference to the fastening members shown in detail in Figs. 7 and 8. To remove a filter unit from the chamber containing it, the clamp screws 71 are loosened to withdraw the bars 70 from engagement with the inner margins of the filter bag 19. The upper end of the bag may then be detached from the tension springs 24 and the lower end portion 25 of the bag may be withdrawn from the outlet member 26 after removing the fastening band 28.

*Operation*

In operation, filtered air or other gas is withdrawn through the conduit 33 which may be connected in conventional or suitable manner to the intake of an exhaust fan of the required capacity. Air or other gas for filter cleaning purposes is admitted through the conduit 35 at atmospheric or higher pressure. Air at atmospheric pressure may be supplied to the conduit 35 or reverse current gas may be supplied to the conduit 35 from the main exhaust fan through a branch pipe carrying a portion of the fan discharge, of or from an auxiliary blower. Dust-laden air or gas enters the casing tangentially through the conduit 34 and is drawn at a suitably high velocity in a spiral path downward through the chamber 12 and into hopper 27 where a large percentage of the entrained dust is deposited due to centrifugal force or by cyclonic action. The air carrying the remaining dust fines or float dust is then drawn up through the central cylindrical chamber 13 and passes into the several filter chambers through the openings 17. Since the pressure in the filter chambers exteriorly of the filter bags 19 is lower than that of the dust-laden air entering through the openings 17, the gas is drawn through the porous filter bags and substantially all of the dust is deposited on the interior surfaces and in the pores of the several bags, while filtered air is drawn out of the chambers 14 through the openings 31, chamber 32 and conduit 33.

During the filtering operation the motor 52, through its driving connection with the cam shaft 55, continuously rotates this shaft at suitable low speed, e. g., approximately 2 to 4 R. P. M., and the cam 57 and finger 60 carried by the cam shaft 55 are operative to turn the wheel 56 and vertical shaft 43 through angular increments corresponding to the angular spacing of the filter chambers 14, center to center, circumferentially of the annular chamber. After each angular movement the rotor dwells in a stationary position wherein the rotary conduit 41 is in communication with one of the filter chambers through one of the openings 31 and the closure member 49 is in closed position in relation to the opening 17 of the same filter chamber. Air or other gas under suitable pressure is thereby caused to pass from the conduit 35, through the opening 37, rotor chamber 38 and conduit 41 to the upper portion of a filter chamber 14 and then as a reverse current, in through the porous sides of the filter bag contained in the same chamber. This current dislodges accumulations of dust within the filter bag and causes the loosened solid particles to be discharged from the lower end of the filter bag through the tubular portion 25 and member 26 into the dust hopper 27. The several filter units are thus cleaned rapidly, one at a time, during the filtering operation.

By reason of my arrangement for causing the dust-laden air to swirl downward in the chamber 12 into the dust hopper 27 and then to pass upward into the central cylindrical chamber 13, a minimum of the entrained dust is carried up into the chamber 13 and thence to the filter bags. Dust carried by the reverse current air out through the bottom of the filter units is carried downward by the cyclonic action and a large percentage of it is deposited in the hopper 27. A large filter area and resulting large capacity is obtained by my circumferential arrangement of a multiplicity of vertically elongated filter units each affording a plurality of substantially radially disposed filter areas which, due to the light dust load, are highly efficient.

It will be evident that my improved dust collector combines the advantages of a cyclone type collector, whereby much of the dust is collected from the air before the latter reaches the filter units, and the advantages of filtering through a porous medium having a highly efficient and economical arrangement of separate units while occupying only the space required for one single-function, simple type collector such as a cyclone collector.

Having described my invention, what I claim as new and desire to protect by Letters Patent is:

1. A dust collector comprising a casing having a substantially cylindrical outer wall, a second substantially cylindrical wall spaced inwardly from the outer wall and substantially coaxial therewith to form an elongated annular chamber in said casing for gas from which dust is to be collected, a third substantially cylindrical wall of smaller diameter than the second wall, substantially coaxial therewith, forming a central cylindrical chamber for receiving such gas from the annular chamber, a plurality of radial walls extending between the second and third walls for forming filter chambers extending substantially radially from and along said cylindrical chamber to said annular chamber, the third wall having openings providing communication between the filter chambers and the cylindrical chamber, a substantially annular wall joining the second and third walls and radial walls along an end of said filter chambers having openings providing outlets for filtered gas from each of said filter chambers, and a fabric filter unit with radially extending walls substantially of the same dimensions as said filter chambers disposed in each of said filter chambers to receive such gas from said central cylindrical chamber and to pass filtered gas to the outlet of the filter chamber.

2. A dust collector comprising a casing having a substantially cylindrical first wall, a second wall spaced inwardly from said first wall forming a central substantially cylindrical chamber, substantially radially disposed partitions in the casing between said substantially cylindrical walls for forming radial filter chambers, the inner wall having peripheral openings connecting with the several filter chambers, means for conducting gas, from which dust is to be collected, at a substantial angular velocity to said central chamber, said casing having a wall transverse to the previously mentioned walls and joining them with openings therein to form an outlet for filtered gas communicating from each of said filter chambers, and a fabric filter unit with radially extending walls of substantially the same radial dimension as said filter chambers, disposed in each of said filter chambers to receive dust-laden gas from said central chamber whereby filtered gas may be passed to said outlets.

3. A dust collector comprising a casing having a substantially vertically disposed cylindrical outer wall, a second substantially cylindrical wall spaced inwardly from said outer wall to form an annular chamber in said casing for gas from which dust is to be collected, a third substantially cylindrical wall of smaller diameter substantially concentric with the outer wall forming a central chamber, substantially radially disposed partitions within said casing between the second and third walls to form a plurality of radial filter chambers, said third cylindrical wall having openings providing ports communicating between the central chamber and the filter chambers, means for conducting such gas to said central chamber from the annular chamber, a horizontal wall joining the radial partitions and the second and third walls and having openings therein providing an outlet for filtered gas from each of said filter chambers, and a filter unit disposed in each of said filter chambers to receive such gas from said central chamber, each said filter unit comprising a fabric bag having a vertical elongated open side communicating with the cylindrical chamber through one of said openings in the third wall to receive such gas therefrom and having porous walls through which the filtered gas is passed to the filter chamber outlet.

4. A dust collector in accordance with claim 3 wherein each of said fabric bags has a bottom opening for the discharge of accumulations of dust.

5. A dust collector comprising in combination a casing having substantially cylindrical outer wall, a substantially cylindrical partition spaced inward from said casing to form an elongated annular chamber for gas from which dust is to be collected, means for conducting such gas substantially tangentially into the annular chamber, a central cylindrical wall spaced inwardly from said cylindrical partition, a plurality of substantially radial partitions extending between the central wall and the cylindrical partition to form radial filter chambers, means for delivering air from the annular chamber to the filter chambers, a transverse wall joined to said central wall and partitions having openings therein to provide an outlet opening for each of said filter chambers to discharge filtered air, and a fabric filter unit with radially extending walls of substantially the same radial dimensions as said filter chambers mounted in each of said filter chambers to receive gas delivered from said annular chamber and to deliver filtered air through one of said outlets.

6. A dust collector comprising in combination a casing having a substantially vertically disposed cylindrical outer wall, a second wall substantially coaxial with the outer wall spaced inwardly therefrom, means for conducting gas from which dust is to be collected substantially tangentially into the upper portion of the space between said walls, a dust hopper extending below said walls in downward continuation of said outer wall to receive gas from said space, a substantially cylindrical third wall spaced inwardly from the second wall to form a substantially cylindrical central chamber, a plurality of substantially radial partitions extending between the second and third walls to form filter chambers extending substantially radially inward from said second wall, said central chamber being disposed to receive said dust-laden gas from said hopper and the second wall being formed with vertically elongated peripheral openings each of which communicate with one of said filter chambers, a wall transverse to said second and third substantially cylindrical walls and the radial partitions having a plurality of openings each of which forms an outlet for filtered gas from one of said filter chambers, and a fabric filter unit with radially extending walls of substantially the same radial dimensions as the said filter chambers disposed in each of said filter chambers to receive gas from said central chamber through said peripheral openings and to discharge filtered gas through one of said outlets.

7. A dust collector comprising in combination a casing having a substantially vertically disposed cylindrical wall serving as an outer wall, a second wall spaced inwardly from the outer wall to form an elongated annular chamber therewith, a third wall substantially cylindrical and substantaily coaxial with the outer wall forming a central chamber, a plurality of radial partitions between the second and third walls forming filter chambers extending substantially radially from and along the said central chamber, said third wall having peripheral openings providing communication between the central chamber and the filter chambers, means for conducting dust-laden gas tangentially to the upper end of said annular chamber and from said annular chamber to said central chamber, a transverse wall joined to said second and third cylindrical walls and said radial partitions having openings therein forming outlets from the filter chambers for filtered gas, a filter unit having fabric walls radially extending with substantially the same radial dimensons as said filter chamber mounted in each of said filter chambers to receive gas from said central chamber and to pass filtered gas to one of said outlet openings, a dust hopper below said chambers communicating with said filter units, and means for reversing the direction of flow of gas through the walls of said filter units one at a time to discharge deposits of dust therefrom into said hopper together with heavy dust collected from said annular chamber by cyclonic action.

8. A dust collector comprising in combination a casing having a first substantially vertically disposed cylindrical wall, a second wall spaced from and within said first wall forming a central cylindrical chamber for receiving gas to be filtered, a plurality of partitions between the first and second walls to form substantially radially disposed filter chambers extending along said central chamber, peripheral openings in said second wall to form inlet openings for the filter chambers communicating with the central chamber, means for conducting dust-laden gas to said central chamber, a transverse wall joined to said first and second walls and said radial partitions and having openings therein to form outlets from the filter chambers, a filter unit disposed in each of said filter chambers to receive such gas from said central chamber, a dust hopper communicating with the lower end of said central chamber and with the lower ends of said filter units, a rotary conduit adapted to supply reverse current gas to the several filter outlets successively, and rotary means operative in timed relation to said rotary conduit for closing the inlet opening for each filter chamber communicating with said central chamber when the rotary conduit supplies reverse current gas to the outlet thereof and drive means with an intermittent gear connection to said rotary means and said rotary circuit.

9. A dust collector comprising in combination spaced first and second substantially cylindrical walls defining an elongated annular chamber between them for receiving gas from which dust is to be collected, means for conducting such gas substantially tangentially into said annular chamber near one end, a dust hopper communicating with the other end of said chamber, a third wall centrally disposed with respect to the first and second walls forming a central chamber and communicating with said dust hopper to receive air therefrom, a plurality of substantially radial partitions between the second and third walls to form filter chambers extending from and along the central chamber, openings in the third wall to provide inlet openings communicating between the central chamber and the filter chambers, a transverse wall joined to the second and third walls and the radial walls with openings therein to provide outlets for filtered gas from each of said filter chambers, a fabric filter unit with radially extending walls of substantially the same radial dimensions as the said filter chambers mounted in each of said filter chambers to receive gas from said central chamber through said filter chamber inlets, each of said units being formed with an outlet for dust communicating with said hopper, means for reversing the direction of flow through said units and to discharge deposits of dust therefrom into said dust-hopper, comprising a rotary conduit adapted to supply reverse current air to the filter outlets one at a time, rotary means operative in timed relation to said rotary conduit for closing the inlet openings of said filter chamber when the rotary conduit supplies reverse current air to the outlet thereof, and drive means with intermittent gear connection to said rotary means and said rotary conduit.

10. A dust collector comprising in combination spaced first and second substantially cylindrical walls forming an elongated annular chamber between them for receiving gas from which dust is to be collected, means for conducting such gas substantially tangentially into said chamber, a dust hopper communicating with said chamber, a third wall substantially cylindrical disposed centrally with respect to the second wall forming a central cylindrical chamber, a plurality of radial partitions between the second and third walls forming filter chambers, said central chamber communicating with said dust hopper to receive dust-laden air therefrom, said third wall having elongated openings providing inlets for said filter chambers, a wall transverse to the second and third walls and the radially extending walls having openings providing an outlet from each of said filter chambers for filtered gas, a filter unit mounted in each of said filter chambers, and having spaced fabric walls radially extending of substantially the same radial dimensions as said filter chambers, each of the filter units being formed with an outlet for dust communicating with said hopper, and means for reversing direction of flow of gas through said filter units and discharging deposits of dust therefrom into said hopper.

References Cited in the file of this patent

UNITED STATES PATENTS

| 272,473 | Prinz | Feb. 20, 1883 |
| 361,711 | Nagel et al. | Apr. 26, 1887 |
| 2,391,534 | Yerrick et al. | Dec. 25, 1945 |
| 2,690,813 | Diebold | Oct. 5, 1954 |

FOREIGN PATENTS

| 297,878 | Italy | June 22, 1932 |
| 366,967 | Germany | Jan. 15, 1923 |
| 614,016 | Germany | May 31, 1935 |